Oct. 22, 1935.  F. WYATT  2,018,048
WEIGHING APPLIANCE
Filed Nov. 6, 1934   3 Sheets-Sheet 3
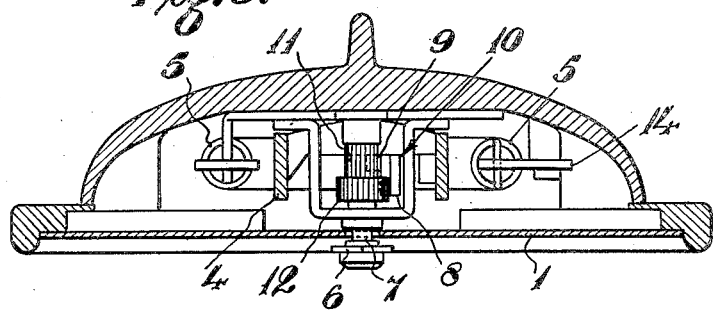
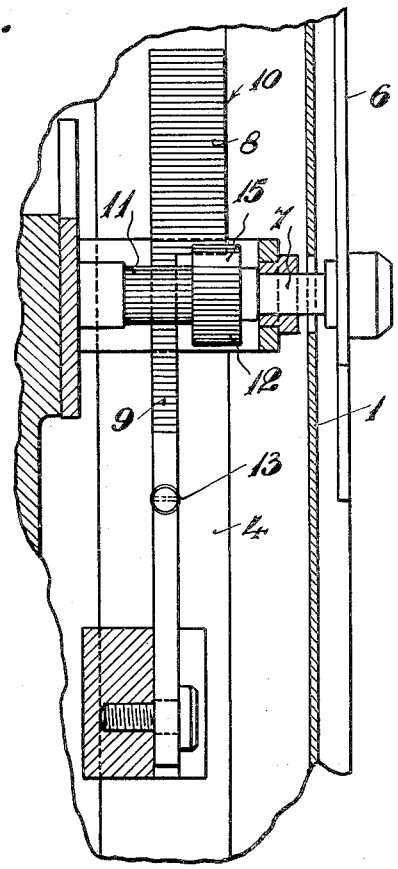
INVENTOR
FRANK WYATT
BY Richards & Geier
ATTORNEYS

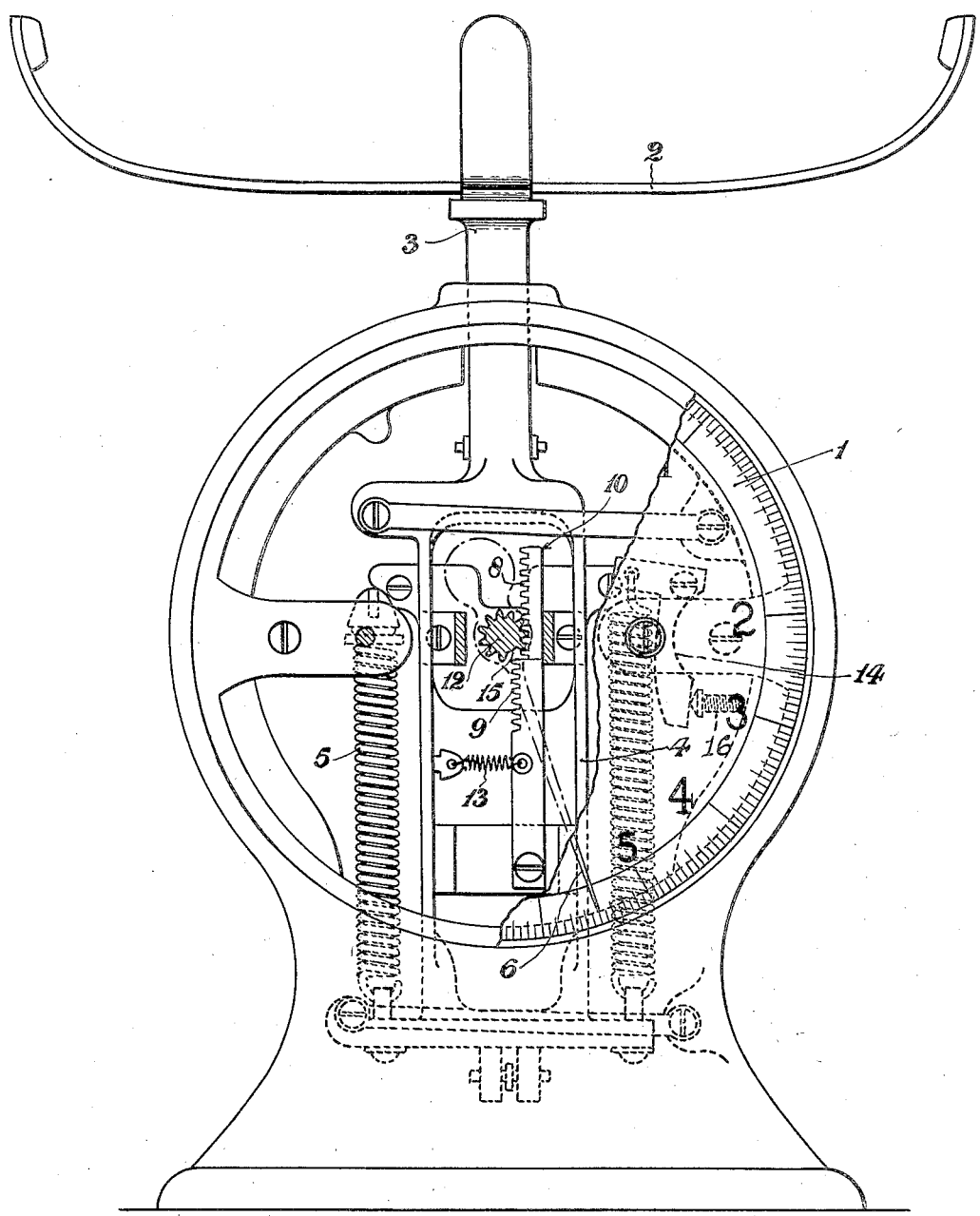

UNITED STATES PATENT OFFICE 2,018,048

WEIGHING APPLIANCE

Frank Wyatt, Birmingham, England, assignor to George Salter and Company Limited, Staffordshire, England Application November 6, 1934, Serial No. 751,699
In Great Britain September 21, 1933

5 Claims. (Cl. 265—68)

This invention relates to spring balances or weighing machines of that kind in which the load actuates a rack, or the like, co-operating with a toothed wheel or segment to cause a pointer or indicator to move over a scale or dial.

The object of the invention is to provide means for controlling the movement of the pointer or indicator of the balance or weighing machine, in such a manner as to permit some of the sections, or divisions, of the scale, representing the same weight units, to be made larger or longer than the others, in order that the said larger or longer sections, or divisions, may be sub-divided to represent fractions of such weight units.

The invention consists essentially in operating the spindle of the pointer or indicator through the medium of two or more racks which come successively into operation, when a load is placed on the scale-pan or weighing platform of the machine, so as to actuate, respectively, toothed wheels or segments of different diameters mounted upon, or operatively connected to, a spindle or part carrying the pointer or indicator. The arrangement is such that when a smaller wheel or segment is actuated the pointer moves through a greater distance for a given downward movement of the scale-pan or weighing platform, than it does when a larger diameter wheel or segment is actuated, since a downward movement equivalent to that which is necessary to turn the smaller wheel through one complete revolution would only turn the larger wheel through a portion of a revolution. The scale divisions or sections are marked according to the movement of the pointer, some of the divisions being larger than the others, and the said larger divisions may thus be divided up to represent smaller weight units, or fractions of the same.

The arrangement may be such that the pointer is actuated first by the smaller diameter pinion so that the said pointer makes a comparatively large movement over large divisions of the dial, for a given downward movement of the scale-pan or weighing platform, compared with the movement of the pointer when actuated by the larger diameter pinion, the latter coming into operation as the first pinion leaves the rack with which it engages, and then moving the pointer over the smaller divisions. Thus, if the scale divisions are marked to represent pounds, the divisions over which the pointer is moved by the smaller diameter pinion are made larger than the others, and are sub-divided to represent parts of an ounce, thus enabling the weight of relatively light articles to be ascertained with considerable accuracy.

Figure 1 of the accompanying drawings is a part-sectional view of a spring balance having two racks in accordance with the present invention, with the dial plate broken away and the lower rack engaging the smaller pinion.

Figure 2 shows the position of the pointer when the upper rack engages the larger diameter pinion.

Figure 3 represents a horizontal section through the spring balance with the racks and the pinions on the pointer spindle in elevation.

Figure 4 is a side view of the pointer spindle with the pinions thereon, upon a larger scale, showing also the two racks, with the lower rack in engagement with the smaller diameter spindle.

Figure 1:
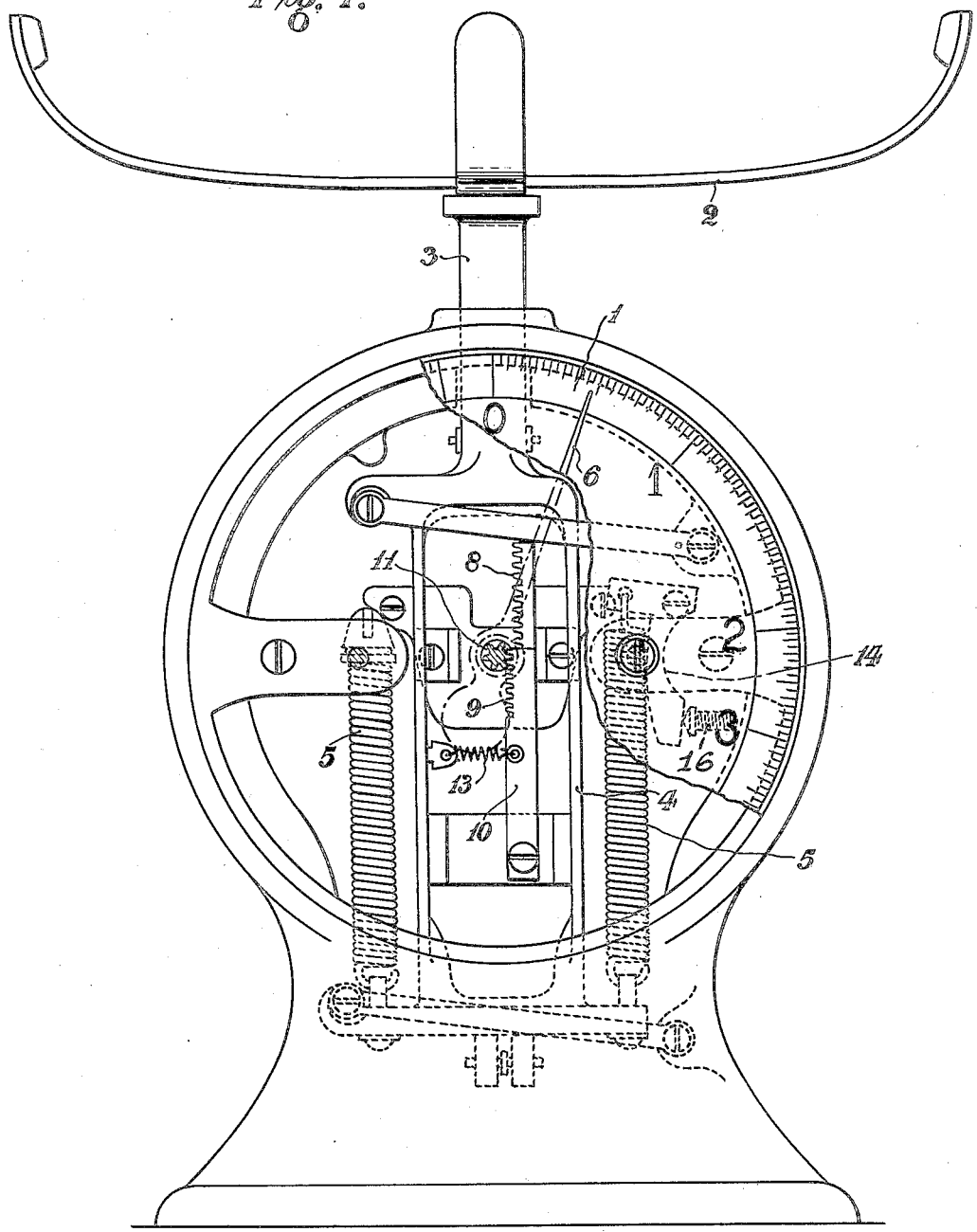

Referring to the drawings, the improved spring balance is provided with a dial or scale 1 graduated to give readings in pounds and ounces, the scale-pan support 2 being carried by a depending stem 3 mounted upon the upper end of a vertically-movable frame 4, guided by links and attached at the bottom to the lower ends of a pair of coiled tension springs 5, the latter being disposed one on each side of the frame 4 and being anchored at their upper extremities to suitable supports. The downward movement, of the frame 4, against the action of the springs 5, under a load, is transmitted to a pointer 6 so that the latter moves over the dial 1 of the balance, which is graduated, as stated, into divisions or sections representing pounds and ounces. These divisions are spaced around the periphery of the dial, but instead of all the "pound" divisions, that is those divisions equal to the movement of the end of the pointer when influenced by each successive pound weight on the scale-pan, being of the same length the first two divisions are substantially twice as long as the others, as shown in Figures 1 and 2 of the drawings. All the divisions are sub-divided to indicate ounces, but the two longer divisions or sections are, in addition, divided up, as illustrated, to represent half-ounces. In order to control the movement of the pointer 6, so that it travels over the scale through a distance just equal to the length of "one pound" division or section for each pound weight on the scale-pan, whether the said division is long or short, the pointer spindle 7 is actuated through the medium of two racks 8 and 9. These racks are disposed one below the other and are both formed as an integral part of a single bar 10, which is shaped as shown so that the lower rack 9 is set nearer to the pointer spindle than the upper rack 8, the two racks being disposed in parallel planes and end to end, that is in such a manner that the two racks come into operation successively without any overlapping and without any idle interval. The two racks 8 and 9, thus provided, move down vertically under the influence of a load and the lower rack is arranged to engage and actuate a small diameter pinion 11 fixed on the pointer spindle 7, whilst the upper rack 8, which is considerably wider than the said lower rack, is arranged, on the other hand, to actuate a larger diameter pinion 12 also fixed on the pointer spindle, the two pinions being arranged side by side, in the manner illustrated in Figure 4, and if desired being in the form of a single compound or stepped pinion unit of two diameters. The teeth of the double-rack bar 10 are maintained in engagement with one or other of the pinions by a light coiled spring 13. In the normal "no load" position the teeth of the lower rack 9 are in mesh with the smaller diameter pinion 11, and as the scale-pan is moved down under a load the teeth of the said lower rack cause the pointer spindle to turn about its axis so that the pointer moves over the two long "pound" divisions of the scale, the last tooth just leaving the pinion 11 as the pointer 6 reaches the end of the second division. As the downward movement is continued the first tooth of the upper rack 8 immediately engages the larger diameter pinion 12 so that the rotaion of the pointer continues without interruption, one of the teeth of he said larger pinion 12 being cut away to leave a gap 15 which is positioned so that the lower rack 9 is just leaving the smaller pinion 11 before the upper rack engages the larger pinion, thus preventing jamming. When the pointer 6 is being actuated through the smaller pinion 11 it obviously rotates through a greater distance than when actuated through the larger pinion for a given downward movement of the scale-pan, and the diameters of the two pinions 11 and 12 are so chosen that for each successive pound weight on the scale pan the pointer moves through the length of one long division when actuated through the smaller pinion, and through the length of one short division when actuated through the larger pinion.

Owing to the first two "pound" divisions of the scale being longer than the others, as stated, and being divided up to give readings in half-ounces, comparatively light weights may be weighed with extreme accuracy, which would not otherwise be possible with a dial of the same size, in a machine weighing up to the same amount. The arrangement also permits the tare weight to be obtained, if desired, for which purpose a taring-screw 16 may be provided projecting from the casing of the machine, and acting, for example, on the one arm of a bell-crank lever 14 the other arm of which forms an anchorage for the upper end of one of the springs 5, so that by actuating the screw the frame carrying the double-rack bar 10 may be raised up to set the pointer 6 to "zero" after the container for the substance being weighed has been placed in the scale-pan; or, if desired, other means may be provided for obtaining the tare weight.

The scale sections may be sub-divided in any suitable manner and more than two long divisions or scale sections may be provided, if desired; or a single long division only may be employed. Also, instead of the racks 8 and 9 being both formed on the same bar, as described, each rack may be formed on a separate bar, the two bars being arranged side by side, with the teeth of the one rack disposed above the teeth of the other rack, the bars being connected together, or to the frame or part which supports the scale pan, in any suitable manner; or the teeth of the two racks may be formed at the edge of a single bar suitably cranked to cause the two rack-sections to lie in parallel planes.

If desired, the arrangment may be such that the pointer is actuated by the larger diameter pinion first and the final movement of the pointer effected through the smaller pinion; also more than two racks may be provided, if desired, with a corresponding number of pinions of different diameters, the scale being graduated or divided accordingly.

Having fully described my invention, what I desire to claim and secure by Letters Patent is:—

1. A weighing appliance comprising a load support, a plurality of racks adapted to be operatively connected to said load support, a scale, a pointer movable over the scale, a spindle carrying the pointer, and a plurality of gear elements of different sizes operatively connected to the spindle and engageable and disengageable with the respective racks, said racks and gear elements being relatively positioned so that the respective racks can successively mesh with and actuate the different gear elements when the load support is depressed, one rack coming into operation as another rack goes out of operation, thereby causing the pointer to move through a greater distance for a given movement of the load support when a smaller gear element is actuated than it does when a larger gear element is actuated.

2. A weighing appliance comprising a load support, a plurality of rack elements adapted to be operatively connected to said load support, a graduated scale divided into sections representing equal weight units some of which sections are larger than the others, a pointer movable over the scale, a spindle carrying the pointer, and a plurality of gear elements of different sizes operatively connected to the spindle and engageable and disengageable with the respective rack elements, said rack elements and gear elements being relatively positioned so that the respective rack elements can successively mesh with and operate the different gear elements when the load support is depressed, one rack element coming into operation as another rack element goes out of operation, so as to cause the pointer to move over the larger scale sections when a smaller gear element is actuated and over smaller scale sections when a larger gear element is actuated.

3. A spring weighing appliance comprising a spring-resisted load support, a plurality of rack elements operatively connected to said load support and disposed one lower than another and in different planes, a graduated scale, a pointer movable over the scale, a spindle carrying the pointer, and a plurality of gear elements of different sizes operatively connected to the spindle and disposed in parallel planes so as to be engageable and disengageable with the respective rack elements, said rack elements and gear elements being so related that the respective rack elements can successively engage and actuate the different gear elements when the load support is depressed, one rack element coming into operation as another rack element goes out of operation.

4. A spring weighing appliance comprising a spring-resisted load support, a single vertical bar operatively connected to said load support and formed with two toothed rack parts in parallel planes and one higher than the other with the teeth of one rack part set forwards of the teeth of the other rack part, a graduated scale, a pointer movable over the scale, a spindle carrying the pointer, and a pair of toothed pinions of different diameters operatively connected to the spindle and disposed in parallel planes so as to be engageable and disengageable with the respective rack parts, said rack parts and pinions being so related that the respective rack parts can successively engage and actuate the two pinions when the load support is depressed, one rack part moving into engagement with one pinion as the other rack part moves out of engagement with the other pinion.

5. A weighing appliance comprising a movable load support, a scale, and an indicator movable relatively to said scale, toothed elements operably connected to said load support and gear elements of different radii attached to said indicator and adapted to be successively engaged and actuated by said toothed elements whereby said indicator is operated by said movable load support, the arrangement being such that the indicator moves over a gearter distance from a given movement of the load support when operated through a gear element of smaller radius than it does when it operates through a gear element of larger radius.

FRANK WYATT.